US008437445B2

(12) United States Patent
Galbally et al.

(10) Patent No.: US 8,437,445 B2
(45) Date of Patent: May 7, 2013

(54) METHOD FOR PREDICTING STRESSES ON A STEAM SYSTEM OF A BOILING WATER REACTOR

(75) Inventors: David Galbally, Madrid (ES); Daniel Verne Sommerville, Soquel, CA (US); Matthew Christopher O'Connor, San Ramon, CA (US); Daniel Charles Pappone, San Jose, CA (US); Hardayal Mehta, San Jose, CA (US); Leslie Wellstein, San Jose, CA (US)

(73) Assignee: General Electric Company, Schenectady, NY (US)

( * ) Notice: Subject to any disclaimer, the term of this patent is extended or adjusted under 35 U.S.C. 154(b) by 1143 days.

(21) Appl. No.: 11/503,268

(22) Filed: Aug. 14, 2006

(65) Prior Publication Data
US 2010/0260301 A1    Oct. 14, 2010

(51) Int. Cl.
*G21C 17/00* (2006.01)

(52) U.S. Cl.
USPC ........... 376/252; 376/245; 376/246; 376/262; 376/357; 376/361

(58) Field of Classification Search .................. 476/245, 476/246, 217
See application file for complete search history.

(56) References Cited

U.S. PATENT DOCUMENTS

| 5,619,433 | A | * | 4/1997 | Wang et al. ............... 703/18 |
| 5,912,933 | A | * | 6/1999 | Shaug et al. ............. 376/216 |
| 8,009,788 | B2 | | 8/2011 | Ohtsuka et al. |
| 2006/0078081 | A1 | * | 4/2006 | Bilanin et al. ............. 376/260 |
| 2007/0098131 | A1 | | 5/2007 | Pappone et al. |
| 2010/0260301 | A1 | | 10/2010 | Galbally et al. |

FOREIGN PATENT DOCUMENTS

| JP | 58184585 A | 10/1983 |
| JP | 63193061 A | 8/1988 |
| JP | 11014782 A | 1/1999 |
| JP | 2002340726 A | 11/2002 |
| JP | 2007127633 A | 5/2007 |
| JP | 2007155361 A | 6/2007 |
| JP | 2007232430 A | 9/2007 |
| JP | 2008046120 A | 2/2008 |

OTHER PUBLICATIONS

GE Energy statement "steam dryer scale model Testing and Load Definition" Nov. 2005, (www.gepower.com/prod_serv/products/nuclear_energy/en/downloads/steam_dryer_scale_model_testing.pdf).*
Takahashi et al., "Evaluation of flow-Induced Vibration for fixed type Guide Rods of Shroud Head and Steam Dryer in ABWR", Proc. of ICONE 10 10th Internat. Conf. on Nuclear Engineering, Arlington, VA, April 14018, 2002.*
Sclaroff et al., Generalized implicit functions for computer grafics, Computer graphics, v. 25, 1991.*
SYSNOISE prospect, LMS Publication nr., 4.0/2059/A20/11.96.*

(Continued)

*Primary Examiner* — Timothy A Brainard
(74) *Attorney, Agent, or Firm* — Harness, Dickey & Pierce, P.L.C.

(57) ABSTRACT

A method of predicting stresses on a BWR steam dryer that includes creating an analytical acoustic model of a BWR steam system; generating pressure estimations by inputting empirical data into the analytical acoustic model of the BWR steam system; creating an analytical structural model of the BWR steam dryer; and predicting stresses on the BWR steam dryer using the analytical structural model and the pressure estimations.

12 Claims, 6 Drawing Sheets

OTHER PUBLICATIONS

Ji, "Acoustic length correction of closed cylindrical side-branched tube", Journal of Sound and Vibration, 283, p. 1180, 2005.*

Ohtsuka et al., "Study of acoustic resonance and Its damping of BWR steam dom", ICAPP 06, Jun. 2006.*

Japanese Office Action dated Dec. 11, 2012 for related Japanese Application No. 2007-198406 (full translation provided).

* cited by examiner

METHOD FOR PREDICTING STRESSES ON A STEAM SYSTEM OF A BOILING WATER REACTOR

CROSS REFERENCE TO RELATED APPLICATIONS

This application is related to U.S. patent application Ser. No. 11/261,489, filed Oct. 31, 2005 to Daniel Charles Pappone et al. and entitled "SYSTEM AND METHOD FOR TESTING THE STEAM SYSTEM OF A BOILING WATER REACTOR", the entire contents of which are hereby incorporated by reference.

BACKGROUND OF THE INVENTION

1. Field of the Invention

The present invention relates generally to a system and method for predicting acoustic loads that may occur during operation of a boiling water reactor (BWR), and more particularly, to develop a pressure load definition using an analytical acoustic model that may be used as input for an analytical structural model of a BWR steam dryer to predict stresses in the BWR steam dryer.

2. Description of the Related Art

A reactor pressure vessel (RPV) of a nuclear reactor such as a boiling water reactor (BWR) typically has a generally cylindrical shape and is closed at both ends, e.g., by a bottom head and a removable top head. A top guide typically is spaced above a core plate within the RPV. A core shroud, or shroud, typically surrounds the reactor core and is supported by a shroud support structure. The shroud has a generally cylindrical shape and surrounds both the core plate and the top guide. There is a space or annulus located between the cylindrical reactor pressure vessel and the cylindrically-shaped shroud.

Heat is generated within the core and water circulated up through the core is at least partially converted to steam. Steam separators separate the steam and the water. Residual water is removed from the steam by steam dryers located above the core. The de-watered steam exits the RPV through a steam outlet near the vessel top head.

Conventional BWRs can experience damage resulting from aero-acoustic loading of the steam dryer during operation. Some conventional BWRs have experienced significant degradation and/or failures of the steam dryer after operating at power levels in excess of the original licensed thermal power.

For example, steam dryer failures may occur due to high cycle fatigue caused by pressure oscillations generated when the vortex shedding frequency associated with flow over the steam dryer and other discontinuities, for example, Safety Relief Valves (SRVs) coincide with certain acoustic natural frequencies of the steam system.

Steam dryer damage can prevent the plant from operating at a desired power level. Further, costs (time, money, etc.) associated with repairs to the steam dryer can be significant. Accordingly, it is desirable to be able to predict the nature of acoustic loads expected on a BWR steam dryer at various power levels so that a structural evaluation of a full-size BWR steam dryer may be performed prior to operating at a higher power level.

Conventionally, there are several methods used to predict the nature of the acoustic loads expected on BWR steam dryers. These methods include (1) empirical generic load estimates based on in plant operating data from different BWR configurations and different operating conditions; (2) plant specific in-vessel instrumentation programs to measure acoustic loads at various power levels; (3) acoustic circuit models of a plant configuration driven by in-plant data obtained at desired power level from instrument lines or main steam line strain gauges; and (4) Computational Fluid Dynamics (CFD) analyses performed for a plant specific configuration.

The empirical generic load estimate is inaccurate and hampered by the fact that the data is obtained from reactor plants other than the plant considered. Thus, no plant-specific information is used to determine if the load estimate is conservative or non-conservative for the plant being considered. This method uses all information available from a BWR steam system in an attempt to produce an acoustic load definition for any plant. The suitability of this method for plant specific applications is difficult to demonstrate. Many utilities complain that the load prediction is too conservative. The Nuclear Regulatory Commission (NRC) complains that the empirical method is not sufficient to differentiate between plants that have experienced steam dryer failures and plants which have not.

In some cases, utilities have decided to pursue in-vessel instrumentation programs to measure actual loads on the steam dryer. However, this method is expensive, which makes it an undesirable approach for many utilities. Further, this method is channel limited, meaning that a limited number of instruments may be placed on the steam dryer to obtain operating data. This number is typically around 40 instrument locations. The limited number of instrument locations inhibits and/or prevents the creation of a fine mesh load definition used in a Finite Element Analysis (FEA). Use of in-vessel instrumentation also requires that the critical regions of the steam dryer be known prior to the time that the in-vessel tests are performed. Further, there is no opportunity to relocate instruments once the reactor is back online and operational. Still further, this method is not predictive. Loads can only be calculated after data is obtained from the plant at the operating conditions that the acoustic loads are desired. It is not possible to extrapolate the expected loads at high power levels using measurements at lower power levels due to the non-linear behavior of the acoustic resonances that cause steam dryer failures. Accordingly, a plant would actually need to operate at potentially damaging power levels in order to obtain relevant data.

Further, some organizations have created acoustic circuit approximations of a plant specific steam system. These analytical models are effectively transfer functions used to predict acoustic loads on the steam dryer from unsteady pressure data obtained from instrumentation lines attached to the RPV, main steam lines or main steam line strain gauges. The acoustic circuit models and methods cannot be used to predict plant-specific loads unless data is obtained from the plant at the operating conditions of the desired acoustic load conditions. The unsteady pressure data is obtained at the end of instrumentation lines containing both liquid water and steam, and thus exhibits significant thermal gradients. The condition of the instrument lines makes an accurate prediction of the unsteady pressure in the steam lines difficult to verify. Additionally, use of main steam line strain gauges provides data that contains mechanical signals introduced into the desired acoustic pressures by main steam line vibration; thus a large number of strain gauges and significant signal processing care must be taken to apply this method. In other words, prediction of the system response in one portion of the system using the response from another portion of the system, without a complete understanding of the location and characteristics of all acoustic sources, makes it difficult to verify the load predictions obtained with this method.

Some CFD analyses have been performed in an effort to understand the loading expected on the steam dryer. However, the lack of empirical data to benchmark this approach, the physical size of the model required to approximate the steam system, and the computational resources required to make an accurate prediction of unsteady pressure oscillations on the steam dryer prevent this approach from being practical. This technology is not yet mature enough to be used for an industrial problem of the complexity exhibited by the BWR steam system.

BRIEF DESCRIPTION OF THE INVENTION

An example embodiment of the present invention is directed to a method of predicting stresses on a boiling water reactor (BWR) steam dryer. The method of predicting stresses on a BWR steam dryer includes creating an analytical acoustic model of a BWR steam system; generating pressure estimations by inputting empirical data into the analytical acoustic model of the BWR steam system; creating an analytical structural model of the BWR steam dryer; and predicting stresses on the BWR steam dryer using the analytical structural model and the pressure estimations.

An example embodiment of the present invention is directed to a method of predicting stresses on a boiling water reactor (BWR) steam dryer. The method of predicting stresses on a BWR steam dryer includes creating an analytical acoustic model of a BWR steam system; generating pressure estimations for a scale model BWR steam volume using the analytical acoustic model; scaling the pressure estimations generated to represent a full-size BWR steam volume; projecting the scaled pressure estimations on a structural mesh of an analytical structural model for the BWR steam dryer; and solving the analytical structural model using finite element analysis to predict stresses on the BWR steam dryer.

BRIEF DESCRIPTION OF THE DRAWINGS

Example embodiments of the present invention will become more fully understood from the detailed description given herein below and the accompanying drawings, wherein like elements are represented by like reference numerals, which are given by way of illustration only and thus are not limitative of the present invention.

DETAILED DESCRIPTION OF THE EXAMPLE EMBODIMENTS

Example embodiments of the present invention as will be described in further detail hereafter are directed to a system and method for predicting stresses that may occur during operation of a typical Boiling Water Reactor (BWR).

Figure 1:
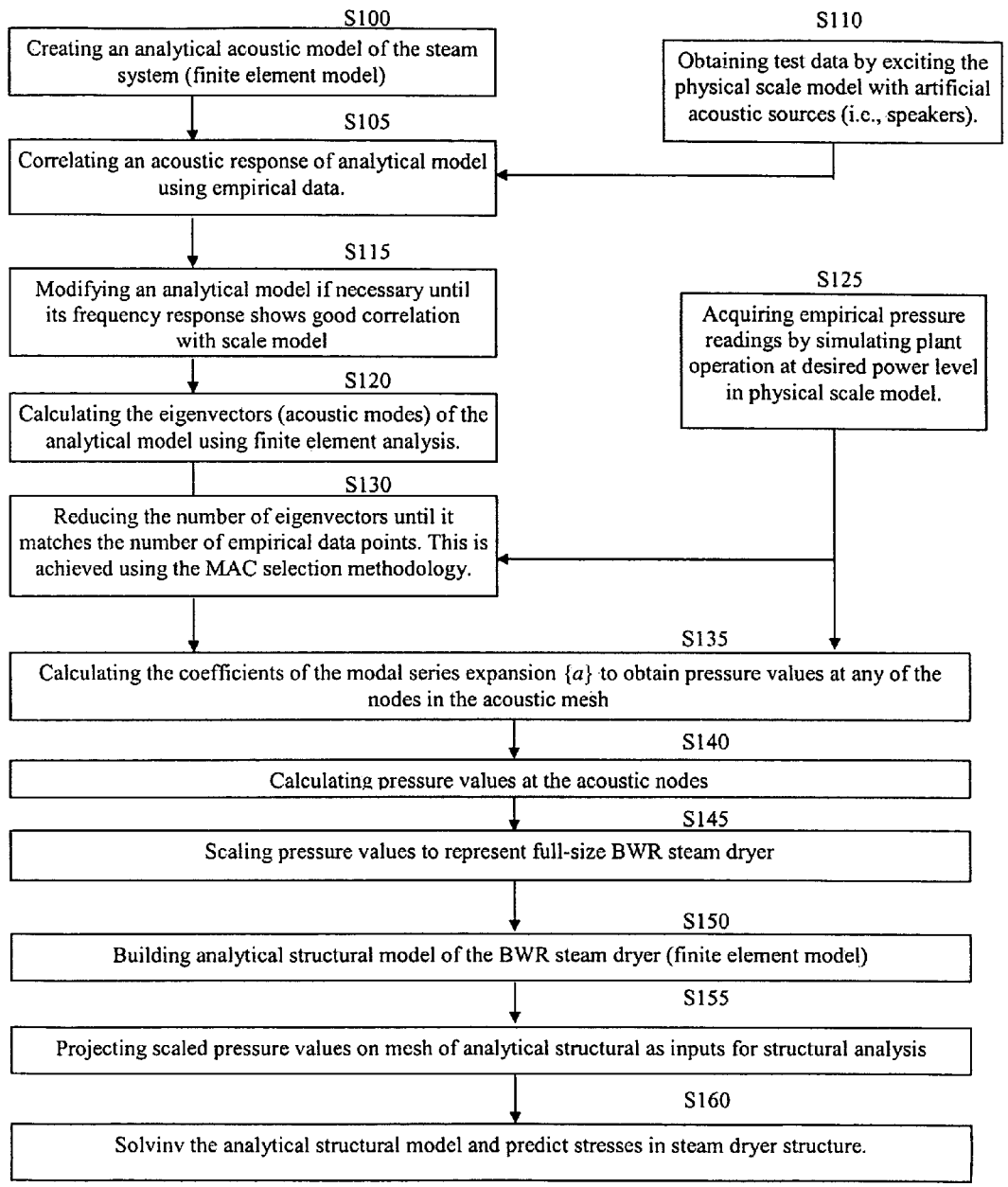
FIG. 1 is an example flowchart illustrating a method of predicting stresses on a boiling water reactor (BWR) steam dryer according to an example embodiment of the present invention.

A method implementing a hybrid experimental/analytical approach for predicting stresses that may occur during operation of a typical Boiling Water Reactor (BWR) according to an example embodiment of the present invention is illustrated in FIG. 1.

As shown in FIG. 1, the method includes creating an analytical acoustic model of a physical scale model of a full-size BWR steam system (step s100); correlating the analytical acoustic model using data obtained from the physical scale model (step s105); obtaining test data from a number of locations on the physical scale model (step s110) used to benchmark the analytical acoustic model; modifying the analytical acoustic model if necessary until the frequency response of the analytical acoustic model sufficiently correlates with the obtained test data (step s115); calculating eigenvectors, i.e. acoustic modes, of the analytical acoustic model using finite element analysis (step s120); acquiring empirical pressure readings by simulating plant operation at a desired power level using the physical scale model (step s125); reducing the number of eigenvectors until the number of eigenvectors match a number of empirical data points (step s130) that may be acquired from the physical scale model; calculating coefficients of a modal series expansion to obtain pressure values at each acoustic node of an acoustic mesh of the analytical acoustic model (step s135); calculating pressure values at the acoustic nodes (step s140); scaling an acoustic load definition generated using the analytical acoustic model to provide an acoustic load definition for the full-size BWR steam system (step s145); building a structural analytical model of the full-size BWR steam system (step s150); projecting the acoustic load definition of the full-size BWR steam dryer onto a structural analytical model of the full-size BWR steam dryer (step s155); and solving the structural analytical model using finite element analysis and predicting stresses for the full-size BWR steam dryer (step s160).

According to an example embodiment of the present invention, an analytical acoustic model of a BWR steam system is created (step s100). In particular, the analytical acoustic model is created using a finite element method to generate a finite element model of a BWR steam volume. The finite element model of the BWR steam volume is a numeric discretization of the volume filled with steam inside a BWR cavity.

Finite element analysis, finite element methods and the creation of a finite element model are well-known in the art and will only be discussed briefly herein for the sake of brevity. The basic idea of a finite element method is to approximate a geometry of a system with a union of simple geometric objects, for example triangles or quadrilaterals for 2D geometries and tetrahedrons for 3D geometries. The simple geometric objects are referred to as elements and each vertex of the geometric objects is referred to as a node. Accordingly, a mesh is produced using a finite element method that includes nodes and elements.

Creating the analytical acoustic model includes producing a three-dimensional virtual model of the BWR steam volume. The BWR steam volume may be modeled using a CAD software package and meshed using a typical finite element meshing solution to create an acoustic mesh.

Figure 2:
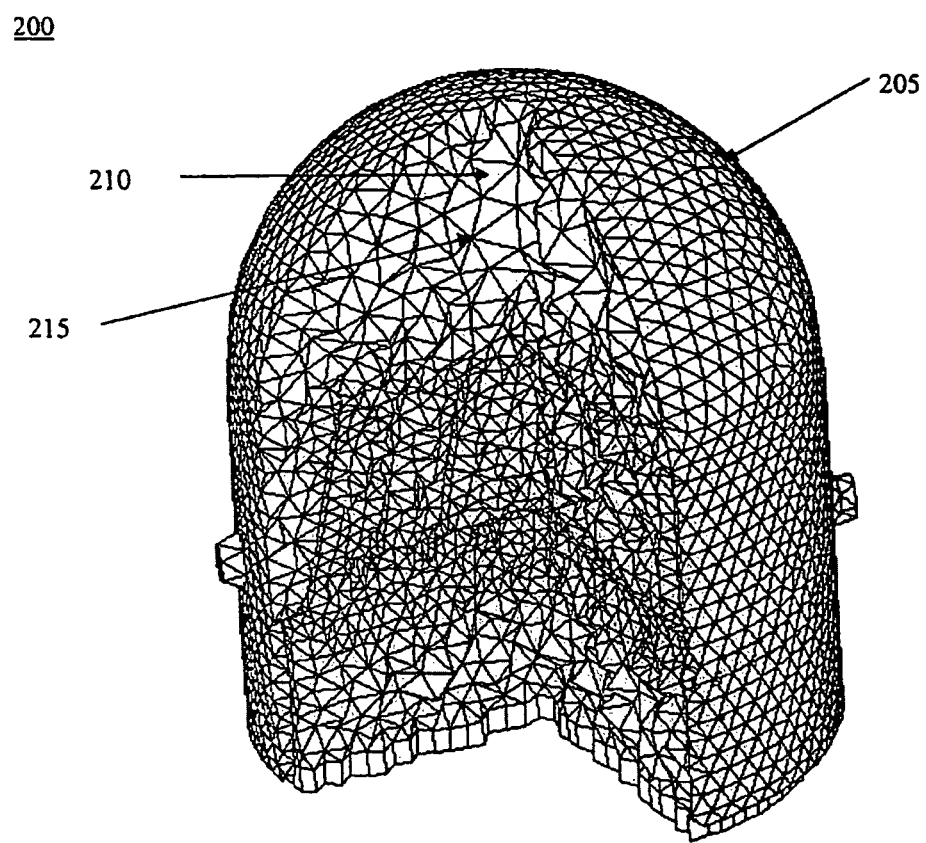
FIG. 2 illustrates an example acoustic mesh generated in accordance with an example embodiment of the present invention.

An example of an acoustic mesh 200 is illustrated in FIG. 2. Surfaces that form boundaries of the BWR steam volume are created, and the boundaries are meshed using 2D elements. The resulting surface mesh may be referred to as a "shell mesh" 205. Then, volumetric 3D elements, such as tetrahedrons, are used to discretize the volume bound by the shell mesh 205. The resulting 3D mesh is referred to as a "solid mesh". The solid mesh of the BWR steam volume is used for developing the analytical acoustic model described herein and includes elements 210 and acoustic nodes 215.

The analytical acoustic model may be correlated using test data obtained from the physical scale model (step s105)

Figure 3:
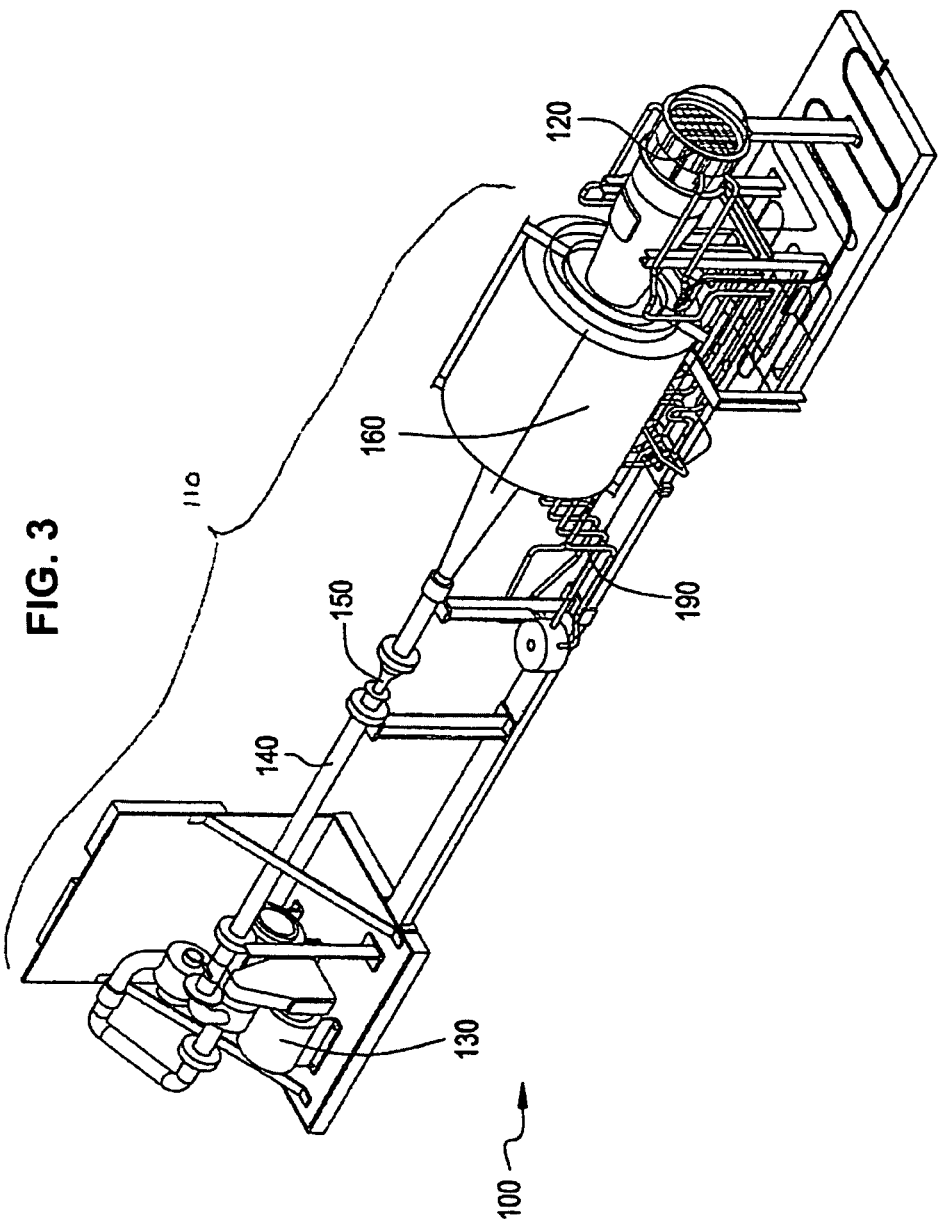
FIG. 3 is a schematic of an example BWR scale model acoustic test system 100 that may be used as a physical scale model according to an example embodiment of the present invention.

FIG. 3 is a schematic of an example BWR scale model acoustic test system 100 that may be used as the physical scale model according to an example embodiment of the present invention. The BWR scale model acoustic test system 100 may be used to provide both test data used to correlate the analytical acoustic system and empirical pressure data acquired by simulating a full-size plant operation at a desired power level using the BWR scale model acoustic test system 100. The empirical pressure data and use of the empirical pressure data will be explained in detail later in this specification.

As shown in FIG. 3, the BWR scale model acoustic test system 100 may include a test fixture 110, model main steam lines 190, and a BWR scale model 120.

The test fixture 110 may include components for generating air flow and routing the air flow to the BWR scale model 120. In particular, the test fixture 110 may include a blower 130, inlet piping 140, a flow meter 150 and a muffler 160. The blower 130 is configured to provide air flow, which may be routed through the inlet piping 140 into the BWR scale model 120. The flow meter 150 and muffler 160 may be located between the blower 130 and the BWR scale model 120. The flow meter 150 may be used to measure the system air flow, and the muffler 160 may be used to substantially isolate the BWR model 120 from noise introduced into the system by the test fixture 110.

The model main steam lines 190 may connect one or more turbine inlets to the BWR scale model 120 and may function to control the characteristics of a steam system of the BWR scale model acoustic test system 100.

Figure 4:
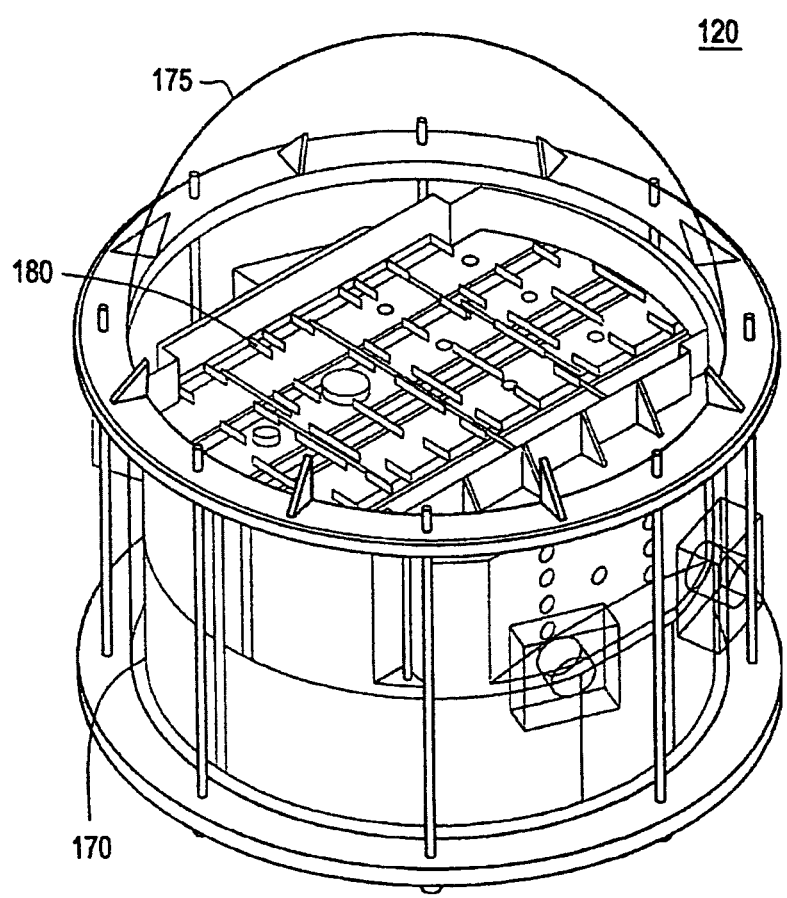
FIG. 4 illustrates an example BWR scale model according to an example embodiment of the present invention.

As shown in FIG. 4, the BWR scale model 120 may include a physical scale model of a RPV 170, a physical scale model of a BWR steam dryer 180 and a physical scale model of a RPV top head 175.

According to an example embodiment of the present invention, the analytical acoustic model of the BWR steam volume may be correlated with the BWR scale model acoustic test system 100 in step s105 using the test data obtained from the BWR scale model acoustic test system 100. In particular, "corresponding results" (i.e., results obtained from the analytical acoustic model that are compared with the test data) obtained from the analytical acoustic model may be benchmarked against the test data obtained from the BWR scale model acoustic test system 100. A variety of tests may be conducted using the BWR scale model acoustic test system 100 and/or subsystems thereof to obtain test data (step s110).

Figure 5:
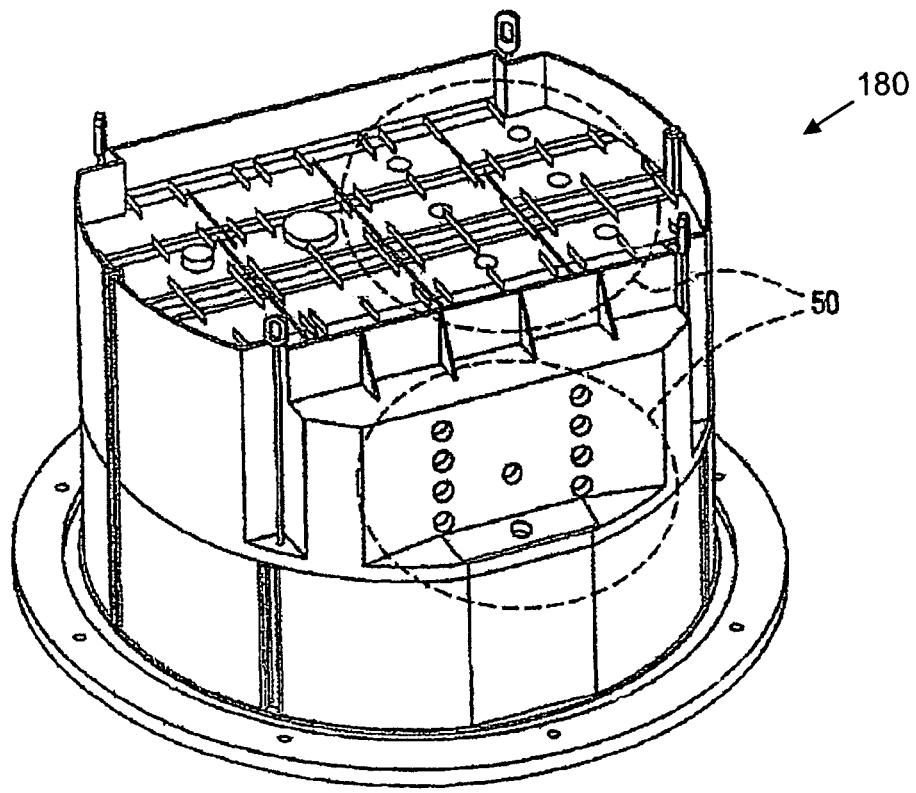
FIG. 5 illustrates a physical scale steam dryer model including measurement device mounted thereon according to an example embodiment of the present invention.

For example, a test may include dividing the BWR scale model acoustic test system 100 into two sub-systems, for example a vessel subsystem (i.e., BWR scale model 120) and piping (i.e., main steam lines 190). An acoustic response of a vessel may be determined by placing a mid-frequency volume velocity source (i.e., a speaker) at one end of a main steam line and closing off the other main steam lines as well as the bottom the BWR scale model 120 with completely rigid surfaces. A frequency response of the BWR scale model 120 may then measured and recorded using sensors, for example microphones, located on and/or near the BWR scale model 120. For example, FIG. 5 illustrates a physical scale model of the BWR steam dryer 180 of the BWR scale model 120 with measurement devices 50 mounted thereon at various locations. In the above-described manner, fluctuating pressure data may be obtained from the physical scale model of the BWR steam dryer 180 using the BWR scale model acoustic test system 100. This fluctuating pressure data may be used as test data, which is correlated with corresponding results obtained from the analytical acoustic model.

As described above, according to an example embodiment of the present invention, the test data is obtained using an artificial acoustic source (i.e., a speaker). Artificial sources are easy to characterize and thus ensures the physical scale model (i.e., the BWR scale model acoustic test system 100) and the analytical acoustic model are excited in a similar manner. Further, because the goal of correlating corresponding results of the analytical acoustic model with the test data is to correlate the acoustic response of the system to acoustic excitations (i.e., sources that produce pressure oscillations), the nature of the source used to obtain the test data is irrelevant.

The corresponding results may be obtained from the analytical acoustic model by simulating the source by applying an acceleration boundary condition to a location (i.e. an acoustic node) on the acoustic mesh of the analytical acoustic model corresponding to the location of the source (i.e. speaker) in the test of the BWR scale model acoustic test system 100 described above. A frequency response analysis is then run using a complex sound speed of $(340+1.7i)$ m/s, which is equivalent to approximately 1% acoustic damping. The pressure value obtained at an acoustic node may be correlated with the location of a measurement device 50. However, it is noted that while a measurement device 50 may be located on the BWR steam dryer 180, the analytical acoustic model according to an example embodiment of the present invention is not a finite element model of the BWR steam dryer 180 or a finite element model of the BWR scale model 120. The analytical acoustic model is a model of the BWR steam volume that surrounds the dryer because this is where the pressure oscillations occur.

Figure 6:
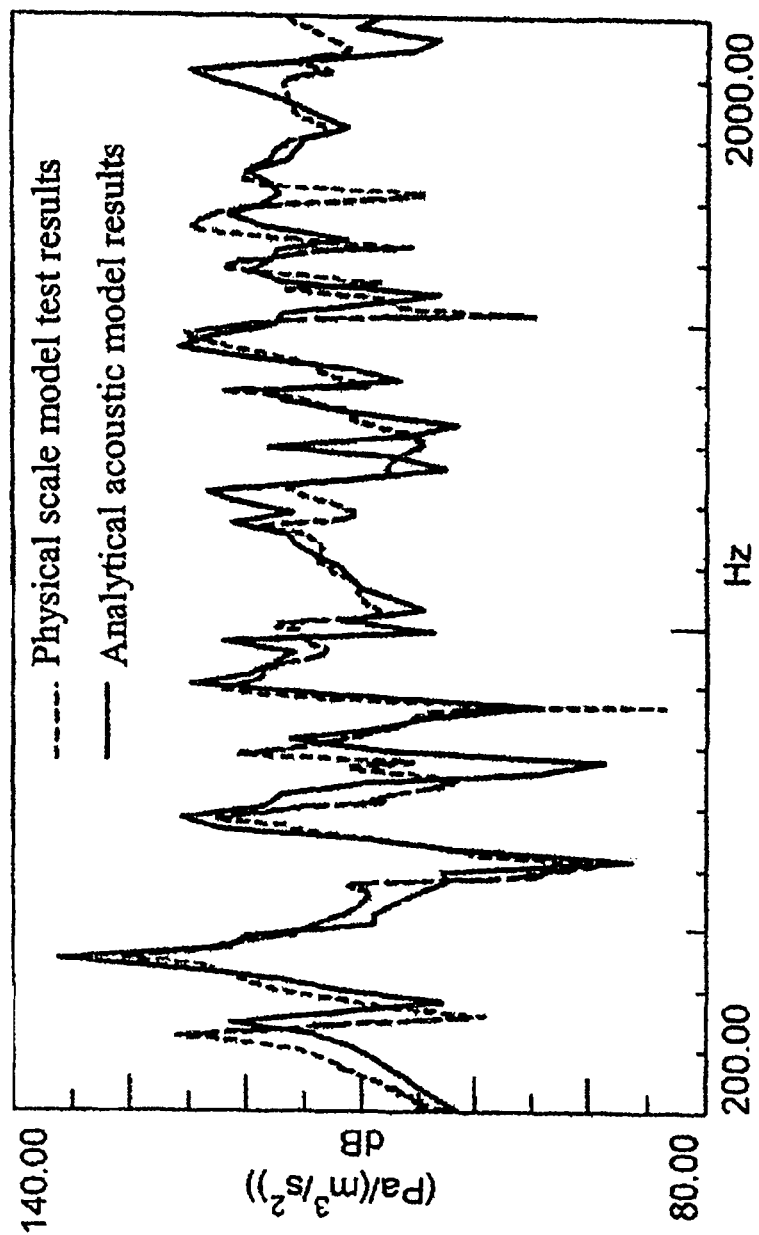
FIG. 6 illustrates that according to an example embodiment of the present invention, results from an analytical acoustic model closely correlate with the test data obtained from the test conducted using the BWR scale model acoustic test system shown in FIG. 3.

FIG. 6 illustrates the frequency response of the vessel cavity (i.e., space within the BWR scale model 120) measured by a microphone compared against the response at the corresponding acoustic node calculated using the analytical acoustic model. As shown in FIG. 6, the results from the analytical acoustic model closely correlate with the test data obtained from the test conducted using the BWR scale model acoustic test system 100. It should be noted that while only a single test example was described above, it will be obvious to one skilled in the art that various test may completed in a similar fashion and thus will not be discussed for the sake of brevity.

Further, the above-described example correlation is merely illustrative and not intended to limit the present invention. For example, similar correlations may be performed for the piping system (i.e., main steam lines 190) without the vessel (i.e., BWR scale model 120) and a final correlation may be completed including both the piping system, the vessel and dryer assembly by placing sources at various locations throughout the system. The main steam lines 190 and BWR scale model 120 may be artificially excited using external acoustic sources. This may be done to verify that the analytical acoustic model replicates the acoustic behavior of the main steam lines 190 and BWR scale model 120. However, it is obvious that the artificial sources do not replicate the actual acoustic sources found in the actual steam system under normal operating conditions.

Step s115 in FIG. 1 illustrates that the analytical acoustic model may be modified based on results of tests as described above. In particular, the analytical acoustic model may be modified until the frequency response of the analytical acoustic model sufficiently correlates with the results of tests performed using the BWR scale model acoustic test system 100 and/or subsystems thereof.

While the example embodiment of the method illustrated in FIG. 1 includes steps s105, s110 and s115, it should be noted that these steps are not necessary to develop a pressure load definition using the analytical acoustic model that may be used as input for an analytical structural model of a steam dryer to predict stresses in a full-size BWR steam dryer. For example, the analytical acoustic model may be used without correlating the analytical acoustic model with test data obtained from the BWR scale model acoustic test system 100 and/or modifying the analytical acoustic model based on the test data. However, steps s105, s110 and s115 are included in the example embodiment of the present invention illustrated in FIG. 1 as an added level of verification to ensure results produced by the method for predicting stresses on a steam system of a boiling water reactor are accurate.

Once the analytical acoustic model is created, eigenvectors (i.e. acoustic modes) may be calculated from the analytical acoustic model using finite element analysis (step s120).

According to an example embodiment of the present invention, the BWR steam volume constitutes a mechanical system that vibrates when disturbed as a result of fluid flow phenomena such as vortex shedding, flow over valves, etc. These vibrations of the BWR steam volume cause pressure oscillations that may damage a BWR steam dryer. The pressure distribution inside the steam volume may be described mathematically as a series of expansion of eigenfunctions. Eigenfunctions and eigenvectors are well-known in the art and will only briefly be discussed herein for the sake of brevity.

Eigenfunctions are used to describe the natural vibration modes of a system, i.e., the BWR steam volume according to an example embodiment of the present invention. The natural vibration modes of a system give the vibration patterns or shapes associated with the natural vibration frequencies at which the system tends to vibrate. The eigenfunctions of a system form a set of orthogonal basis functions that span the solution space of the system. Accordingly, any natural state of a system, such as the BWR steam volume, may be described as a series of expansion of the eigenfunctions. Each eigenvector is defined as a set of values that correspond to the values of the eigenfunction at each node. Accordingly, an eigenvector is a set of numerical values calculated from the eigenfunctions at nodes of the mesh.

Accordingly, the completion of step s120 in FIG. 1 provides an analytical acoustic model. In particular, an acoustic mesh with eigenvectors that represent the natural patterns of the pressure oscillations in the steam system at each node 215 of the acoustic mesh 200.

As shown in step s125, empirical pressure data may be acquired by simulating a full-size plant operation at a power level using the BWR scale model acoustic test system 100. For example, the BWR scale model acoustic test system may include approximately 50 microphones that record pressure data when the BWR scale model acoustic test system is used to simulate plant operation at a desired power level. Accordingly, approximately 50 empirical data points may be obtained.

As shown in step s130, the number of eigenvectors may be reduced until the number matches a number of empirical data points obtained from the BWR scale model acoustic test system 100. For example, the number of eigenvectors may be reduced until the number of eigenvectors is approximately 50.

The reduction of the eigenvectors in step s130 may be expressed and explained mathematically by equations (5)-(8) explained below.

As discussed above, the analytical acoustic model according to an example embodiment of the present invention represents the BWR steam volume and the pressure distribution inside the BWR steam volume may be described mathematically as a series expansion of eigenfunctions. Further, the solution at some points of dryer, i.e. the locations of the microphones on the BWR scale model acoustic test system 100 obtained in step s125, are known. Accordingly, the pressure distribution inside the BWR steam volume may be mathematically represented as shown in Equation (1).

$$P(x, y, z) = \sum_{m=1}^{\infty} a_m \phi_{nm} \tag{1}$$

The pressure is known at a set of points $(x_k, y_k, z_k)$ that correspond to locations of the microphones on the BWR steam dryer 180. Calculating the eigenvectors of the steam system $\phi_{nm}$, would provide the constants $a_m$ that define the pressure distribution at every location inside the BWR steam volume. Equation (2) corresponds to equation (1) expressed in matrix form.

$$\begin{bmatrix} P_1 \\ P_2 \\ P_3 \\ \ldots \\ P_n \end{bmatrix} = \begin{bmatrix} \phi_{11} & \phi_{12} & \phi_{13} & \ldots & \phi_{1m} \\ \phi_{21} & \phi_{22} & \phi_{23} & \ldots & \phi_{2m} \\ \phi_{31} & \phi_{32} & \phi_{33} & \ldots & \phi_{3m} \\ \ldots & \ldots & \ldots & \ldots & \ldots \\ \phi_{n1} & \phi_{n2} & \phi_{n3} & \ldots & \phi_{nm} \end{bmatrix} \begin{bmatrix} a_1 \\ a_2 \\ a_3 \\ \ldots \\ a_n \end{bmatrix} \tag{2}$$

In Equation (2), $P_{1\ldots n}$ represent the pressure values at the nodes of the acoustic analytical model; $\Phi_{11\ldots nm}$ represent eigenvalues that are known after solving the acoustic analytical model of the BWR steam volume; $a_{1\ldots m}$ represent unknown constants; n represents the number of nodes in the acoustic analytical model; and m represents the number of eigenvectors or natural modes of the BWR steam volume.

An examination of Equation (2) shows there are two sets of unknowns (i.e., pressure values at the nodes {P} and coefficients of the linear combination of modes {a}). However, according to an example embodiment of the present invention, not all the elements that form vector {P} are unknowns because some of eigenvalues are known due to the empirical data obtained during step s125.

Therefore, Equation (2) may be rewritten into Equation (3) shown below.

$$\begin{bmatrix} P_1 \\ P_2 \\ P_3 \\ \cdots \\ P_k \\ P_{k+1} \\ \cdots \\ P_n \end{bmatrix} = \begin{bmatrix} \phi_{11} & \phi_{12} & \phi_{13} & \cdots & \phi_{1m} \\ \phi_{21} & \phi_{22} & \phi_{23} & \cdots & \phi_{2m} \\ \phi_{31} & \phi_{32} & \phi_{33} & \cdots & \phi_{3m} \\ \cdots & \cdots & \cdots & \cdots & \cdots \\ \phi_{k1} & \phi_{k2} & \phi_{k3} & \cdots & \phi_{km} \\ \phi_{k+1} & \phi_{k+1,2} & \phi_{k+1,3} & \cdots & \phi_{k+1,m} \\ \cdots & \cdots & \cdots & \cdots & \cdots \\ \phi_{n1} & \phi_{n2} & \phi_{n3} & \cdots & \phi_{nm} \end{bmatrix} \begin{bmatrix} a_1 \\ a_2 \\ a_3 \\ \cdots \\ a_k \\ a_{k+1} \\ \cdots \\ a_m \end{bmatrix} \quad (3)$$

The notation in Equation (3) corresponds with the notation in Equation (2) with the additional subscript k that represents the number of microphone locations in the BWR scale model acoustic test system 100.

Equation (4) is produced by eliminating the unknown pressures in Equation (3) above.

$$\begin{bmatrix} P_1 \\ P_2 \\ P_3 \\ \cdots \\ P_k \end{bmatrix} = \begin{bmatrix} \phi_{11} & \phi_{12} & \phi_{13} & \cdots & \phi_{1m} \\ \phi_{21} & \phi_{22} & \phi_{23} & \cdots & \phi_{2m} \\ \phi_{31} & \phi_{32} & \phi_{33} & \cdots & \phi_{3m} \\ \cdots & \cdots & \cdots & \cdots & \cdots \\ \phi_{k1} & \phi_{k2} & \phi_{k3} & \cdots & \phi_{km} \end{bmatrix} \begin{bmatrix} a_1 \\ a_2 \\ a_3 \\ \cdots \\ a_k \\ a_{k+1} \\ \cdots \\ a_m \end{bmatrix} \quad (4)$$

The system represented in Equation (4) is almost solvable, i.e., Equation (4) has a vector of known coefficients on one side, {P}, and a vector of unknowns on the other side, {a}. The remaining problem is that the number of known pressure points, k, is lower than the number of unknowns, m. Therefore, the system of equations is underdetermined and does not have a unique solution.

The number of unknowns, m, is given by the number of relevant eigenvectors that the system has. A continuous system has an infinite number of eigenvectors but only some of eigenvectors are "relevant eigenvectors", i.e., eigenvectors needed to obtain a reasonably accurate solution. The terms "relevant eigenvectors" and "reasonably accurate" are very subjective and there is not an analytical equation that will give the most relevant eigenvectors for a particular system.

After selecting the most relevant eigenvectors, Equations (4) may be reduced to Equation (5), which has only k eigenvectors as shown below.

$$\begin{bmatrix} P_1 \\ P_2 \\ P_3 \\ \cdots \\ P_k \end{bmatrix} = \begin{bmatrix} \phi_{11} & \phi_{12} & \phi_{13} & \cdots & \phi_{1k} \\ \phi_{21} & \phi_{22} & \phi_{23} & \cdots & \phi_{2k} \\ \phi_{31} & \phi_{32} & \phi_{33} & \cdots & \phi_{3k} \\ \cdots & \cdots & \cdots & \cdots & \cdots \\ \phi_{k1} & \phi_{k2} & \phi_{k3} & \cdots & \phi_{kk} \end{bmatrix} \cdot \begin{bmatrix} \alpha_1 \\ \alpha_2 \\ \alpha_3 \\ \cdots \\ \alpha_k \end{bmatrix} \quad (5)$$

Equation (5) may be solved in order to calculate the vector of modal expansion coefficients {a} as illustrated in step s135 of FIG. 1. The modal expansion coefficients {a} are used to determine the pressures at those nodes where there is no empirical data from the BWR scale model acoustic test system 100 by solving Equation (6).

$$\begin{bmatrix} P_{k+1} \\ P_{k+2} \\ P_{k+3} \\ \cdots \\ P_n \end{bmatrix} = \begin{bmatrix} \phi_{k+1,1} & \phi_{k+1,2} & \phi_{k+1,3} & \cdots & \phi_{k+1,k} \\ \phi_{k+2,1} & \phi_{k+2,2} & \phi_{k+2,3} & \cdots & \phi_{k+2,k} \\ \phi_{k+3,1} & \phi_{k+3,2} & \phi_{k+3,3} & \cdots & \phi_{k+3,k} \\ \cdots & \cdots & \cdots & \cdots & \cdots \\ \phi_{n,1} & \phi_{n,2} & \phi_{n,3} & \cdots & \phi_{nk} \end{bmatrix} \begin{bmatrix} a_1 \\ a_2 \\ a_3 \\ \cdots \\ a_k \end{bmatrix} \quad (6)$$

Solving Equation (6) provides pressure values {P} at all the points of the BWR steam volume. In other words, the pressure values at the acoustic nodes of the shell mesh, which correspond to locations on the steam dryer 180 of the BWR scale model acoustic test system 100, may be calculated in step s140 of FIG. 1.

However, the pressures values calculated by solving Equation (6) are pressure estimation values that represent the pressure distribution located inside the BWR scale model 120, and the BWR scale model 120 is a physical scale model of a full-size BWR. Accordingly, the pressure estimation values need to be scaled to represent pressure estimation values representing a full-size BWR. This scaling is shown as step s145 in FIG. 1.

The pressure estimation values calculated using the analytical acoustic model as described with respect to steps s105 to s140 are significantly lower than the pressures expected in a full-size BWR. Accordingly, pressure values are scaled up using a ratio of the densities between the flowing material used in the BWR scale model acoustic test system 100, for example air, and the steam used in the full size BWR plant. The pressure values may be scaled up using the squared ratio of the acoustic velocities in air and steam. These scaling relationships are based on typical dimensionless numbers used in fluid mechanics as is well-known in the art and will only be discussed briefly herein for the sake of brevity.

If all aspects of the BWR scale model 120 and the physical scale model of main steam lines 190 are built to the same arbitrary scale and the model air flow Mach number is the same as the plant steam flow Mach number, then the natural acoustic frequencies in the BWR scale model 120 and main steam line scale models 190 will be proportionately related to the natural acoustic frequencies in the full size BWR plant modeled by the BWR scale model acoustic test system 100 by Equation (7). It is noted that the "natural acoustic frequencies" are not the same as acoustic modes previously referred to in this description. Each natural acoustic frequency has an associated acoustic mode and vice versa, but the natural acoustic frequencies are scalar values and acoustic modes are vectors that represent pressure distribution patterns.

$$\frac{f_{Plant}}{f_{Test}} = \left(\frac{d_{Test}}{D_{Plant}}\right)\left(\frac{C_{Plant}}{C_{Test}}\right) \quad (7)$$

Similarly, the pressures from the analytical acoustic model modeling the BWR steam volume and the empirical data acquired using the BWR scale model acoustic test system are related to the full-size BWR plant pressures by Equation (8).

$$\frac{P_{Plant}}{P_{Test}} = \left(\frac{\rho_{Plant}}{\rho_{Test}}\right)\left(\frac{C_{Plant}}{C_{Test}}\right)^2 \quad (8)$$

According to an example embodiment of the present invention, the scaled pressure values may then be used in conjunction with an analytical structural model of a full-size BWR steam dryer that is generated in step s150 of FIG. 1.

The analytical structural model is a finite element model of a full-size BWR steam dryer. According to an example embodiment of the present invention, the analytical structural model is a finite element model of a full-size BWR steam dryer that is modeled by the scale model BWR steam dryer 180. Creating a finite element model is well-known in the art and will only be discussed briefly herein for the sake of brevity. The Theory of Elasticity is a well-known discipline that describes the relations between loads, stresses and strains in terms of Partial Differential Equations (PDEs). Accordingly, if the loads on a structure are known, the stresses and strains on a structure may be calculated by solving PDEs. Structures may fail due to high stresses and/or strains and thus, solving the PDEs may also be used to predict system failures, for example cracks and or damage on the full-size BWR steam dryer.

Performing a Finite Element Analysis on a full-size BWR steam dryer according to an example embodiment of the present invention includes two basic inputs including (1) a geometry of the full-size BWR steam dryer, which may be measure by any number of conventional techniques and (2) loads applied to the steam system of the BWR, which correspond to the scaled pressure estimations calculated in step s145 of FIG. 1.

The geometry of the full-size BWR steam dryer may be modeled using a CAD software package and meshed using a typical finite element meshing solution to create a mesh as is well-known in the art. This process provides a structural mesh of the full-size BWR steam dryer, which includes nodes and elements as previously described previously with respect to the acoustic mesh of the analytical acoustic model created in step s105 of FIG. 1.

As shown in step s155 of FIG. 1, the scaled pressure values are then projected onto the structural mesh of the full-size BWR steam dryer and used as inputs for the analytical structural model. The analytical acoustic model of the BWR steam volume is not be the same as the analytical structural model of the full-size BWR steam dryer structure. Therefore, the location of the nodes on the dryer surface will differ between the two models. As described above, solving Equation (6) provides pressure values at the acoustic nodes of the analytical acoustic model. These pressures are projected onto the structural nodes of the analytical structural model. In particular, each structural node is assigned the pressure of the closest acoustic node. An interpolation algorithm may be used if the number of structural nodes is greater than the number of acoustic nodes.

The analytical structural model may then be solved to predict stresses in the full-size BWR steam dryer. As described above, a structure may fail due to high stresses and/or strains.

Accordingly, example embodiments of the present invention provide a predictive tool. The predictive tool may be used to prevent a plant from operating at a power level for which loads are not currently known. This is because simulations can be conducted using the analytical acoustic tool in conjunction with a physical scale model such as the BWR scale model acoustic test system. Accordingly, example embodiments of the present invention enable a utility to predict possible problems prior to operating a full-size BWR steam plant at a potentially damaging power levels.

The example embodiments of the present invention being thus described, it will be obvious that the same may be varied in many ways. Such variations are not to be regarded as departure from the spirit and scope of the example embodiments of the present invention, and all such modifications as would be obvious to one skilled in the art are intended to be included within the scope of the following claims.

What is claimed:

1. A method of predicting stresses on a boiling water reactor (BWR) steam dryer, comprising:
    acquiring pressure data from a BWR scale model system using at least one of a pressure transducer and a microphone at the BWR scale model system, the pressure data being empirical data;
    creating an analytical acoustic model of a BWR steam system;
    generating pressure estimations by inputting the empirical data into the analytical acoustic model of the BWR steam system;
    creating an analytical structural model of the BWR steam dryer; and
    predicting stresses on the BWR steam dryer using the analytical structural model and the pressure estimations.

2. The method of claim 1, wherein creating the analytical acoustic model includes:
    producing a three-dimensional virtual model of a scale model BWR steam volume.

3. The method of claim 2, wherein generating pressure estimations includes:
    calculating acoustic modes of the BWR steam volume.

4. The method of claim 3, wherein generating pressure estimations further includes:
    reducing the number of acoustic modes to equal a number of empirical data points.

5. The method of claim 3, wherein generating the pressure estimations further includes:
    calculating coefficients of a modal series expansion based on the reduced number of acoustic modes and the empirical data to generate the pressure estimations at each node of the acoustic mesh.

6. The method of claim 5, wherein generating pressure estimations further includes:
    scaling the pressure estimations generated for the BWR scale model system to represent a full-size BWR steam volume.

7. The method of claim 1, wherein creating the analytical acoustic model includes:
    correlating test data obtained from the BWR scale model system with results obtained from the analytical acoustic model.

8. The method of claim 7, wherein creating the analytical acoustic model includes:
    modifying the analytical acoustic model based on the correlating until the test data substantially corresponds with the results obtained from the analytical acoustic model.

9. The method of claim 1, wherein creating an analytical structural model of the BWR steam dryer includes:
    producing a three-dimensional virtual model of the BWR steam dryer; and
    discretizing the three-dimensional virtual model using a finite element meshing algorithm to provide a structural mesh of the BWR steam dryer.

10. The method of claim 9, further comprising:
    scaling the pressure estimations generated for the BWR scale model system to represent a full-size BWR steam volume;
    projecting the scaled pressure estimations on the structural mesh of the analytical structural model.

11. The method of claim 10, further comprising:
using finite element analysis to solve the analytical structural model based on the projected scaled pressure estimations;
predicting stresses in the BWR steam dryer based on the solved analytical structural model.

12. A method of predicting stresses on a boiling water reactor (BWR) steam dryer, comprising:
creating an analytical acoustic model of a BWR steam system;
generating pressure estimations using the analytical acoustic model by inputting empirical data acquired from a BWR scale model system;
scaling the pressure estimations generated to represent a full-size BWR steam volume;
projecting the scaled pressure estimations on a structural mesh of an analytical structural model for the BWR steam dryer; and
solving the analytical structural model using finite element analysis to predict stresses on the BWR steam dryer.

* * * * *